United States Patent
McGinn et al.

[11] 3,772,910
[45] Nov. 20, 1973

[54] PRECISION VISCOMETER TIMER CONTROL SYSTEM

[75] Inventors: James N. McGinn; Thomas L. Dellecave, both of Rome, N.Y.

[73] Assignee: The United States of America as represented by the Secretary of the Air Force, Washington, D.C.

[22] Filed: Dec. 22, 1971

[21] Appl. No.: 210,981

[52] U.S. Cl. .................................................. 73/57
[51] Int. Cl. ........................................... G01n 11/12
[58] Field of Search .......................................... 73/57

[56] References Cited
UNITED STATES PATENTS

| | | | |
|---|---|---|---|
| 3,375,705 | 4/1968 | Kim | 73/57 |
| 3,368,391 | 2/1968 | Harrison et al. | 73/57 |
| 3,240,053 | 3/1966 | Jones | 73/57 |
| 2,955,459 | 10/1960 | Cihelka et al. | 73/57 |
| 2,252,572 | 8/1941 | Lang | 73/57 |
| 1,780,952 | 11/1930 | Symmes | 73/57 |

FOREIGN PATENTS OR APPLICATIONS

| | | | |
|---|---|---|---|
| 758,199 | 10/1956 | Great Britain | 73/57 |
| 863,510 | 3/1961 | Great Britain | 73/57 |
| 899,369 | 6/1962 | Great Britain | 73/57 |
| 151,103 | 10/1961 | U.S.S.R. | 73/57 |

*Primary Examiner*—Richard C. Queisser
*Assistant Examiner*—Joseph W. Roskos
*Attorney*—Harry A. Herbert, Jr. et al.

[57] ABSTRACT

A precision viscometer timer control system where a pair of spaced coils surround a precision tube, so that as a metal ball passes through the coil the inductance is changed causing an oscillator circuit to react, influencing a switching circuit thereby automatically starting and stopping a connected timer.

3 Claims, 2 Drawing Figures

PRECISION VISCOMETER TIMER CONTROL SYSTEM

BACKGROUND OF THE INVENTION

This invention relates generally to measuring systems and more particularly to a system for measuring the viscocity of fluids.

A known method of measuring viscosity involves the use of a metal ball falling through a fluid to be tested and measuring the time required for the ball to fall a specific distance.

The viscosity of the fluid is calculated by solving the following equation: $\mu = K (P_f - P) t$
where:

$\mu$ = Viscosity of the fluid
$K$ = Viscometer constant
$P_f$ = Density of float
$P$ = Density of fluid
$t$ = time required for falling ball to traverse a prescribed distance.

Falling ball viscometers have been widely used to measure viscosity of various fluids. A falling ball viscometer consists of a precision tube, a ball release mechanism, and a metal ball.

In the past, measurements of time of flight were made by utilizing a glass tube and actually observing the ball as it fell between lines scribed on the glass and measuring the time with a stop watch.

This system is adequate where a precise time measurement is not required, the viscosity is relatively low and the ball will fall at a moderate rate. The system is also acceptable where a single measurement is made, as opposed to a testing laboratory where a large number of tests are conducted simultaneously.

A limited improvement to this method is the utilization of a pair of high intensity light sources to radiate through the glass tube and fluid, at the scribe marks, into a pair of photo detectors. As the ball interrupts the first light beam, a connected timer begins to count and as the ball interrupts the second light beam, the timer stops. This improvement is limited, however, to use with clear fluids. If the fluid tested is dark or otherwise causes diffusion in the light beam, the performance of the system ranges from inaccurate to inoperable.

There has been a need then to provide a system that will measure the viscosity of fluids with extreme accuracy regardless of the length of time the measurement requires or the degree of translucence of the fluid.

SUMMARY OF THE INVENTION

The Precision Viscometer Timer Control System solves the problems of the prior art. The system utilizes a precision tube that may be formed from any nonconductive material, a metal ball, a ball release mechanism, and a first and second sensor and a sensing circuit connected to a timing means.

The first and second sensors are formed of coils of wound wire and surround the precision tube at a prescribed distance apart. As the metal ball passes through the coils the inductance changes in the coil causing the sensing circuit first to start the timer, and second to stop the timer.

One of the important features of the invention is the inclusion of a highly accurate sensing circuit. Prior art circuits that could perform a sensing function such as that described, have an important drawback in that they lack the sensitivity to accurately determine the position of the falling ball during each and every test regardless of the fluid tested.

The system of the invention consists of three subsystems, these subsystems include an oscillator circuit, a detector circuit and an RC switching circuit. The sensing coils form part of the oscillator circuit.

It is therefore, an object of the invention to provide a new and improved system, for measuring the viscosity of fluids.

It is another object of the invention to provide a new and improved viscosity measuring system that is more accurate than any hitherto known.

It is a further object of the invention to provide a new and improved system that will allow for the reproducibility of results.

It is still another object of the invention to provide a viscosity measuring system that will provide precise results regardless of the opacity of the fluid tested.

It is still another object of the invention to provide a system for viscosity measuring that is completely automatic.

It is another object of the invention to provide a system that will measure the viscosity of fluids over a relatively long time span with a high degree of accuracy.

It is another object of the invention to provide a precision viscometer timer control system which is economical to produce and utilizes conventional, currently available components that lend themselves to standard mass production manufacturing techniques.

These and other advantages features and objects of the invention will become more apparent from the following description taken in connection with the illustrative embodiment in the accompanying drawing.

DESCRIPTION OF THE PREFERRED EMBODIMENT

Figure 1:
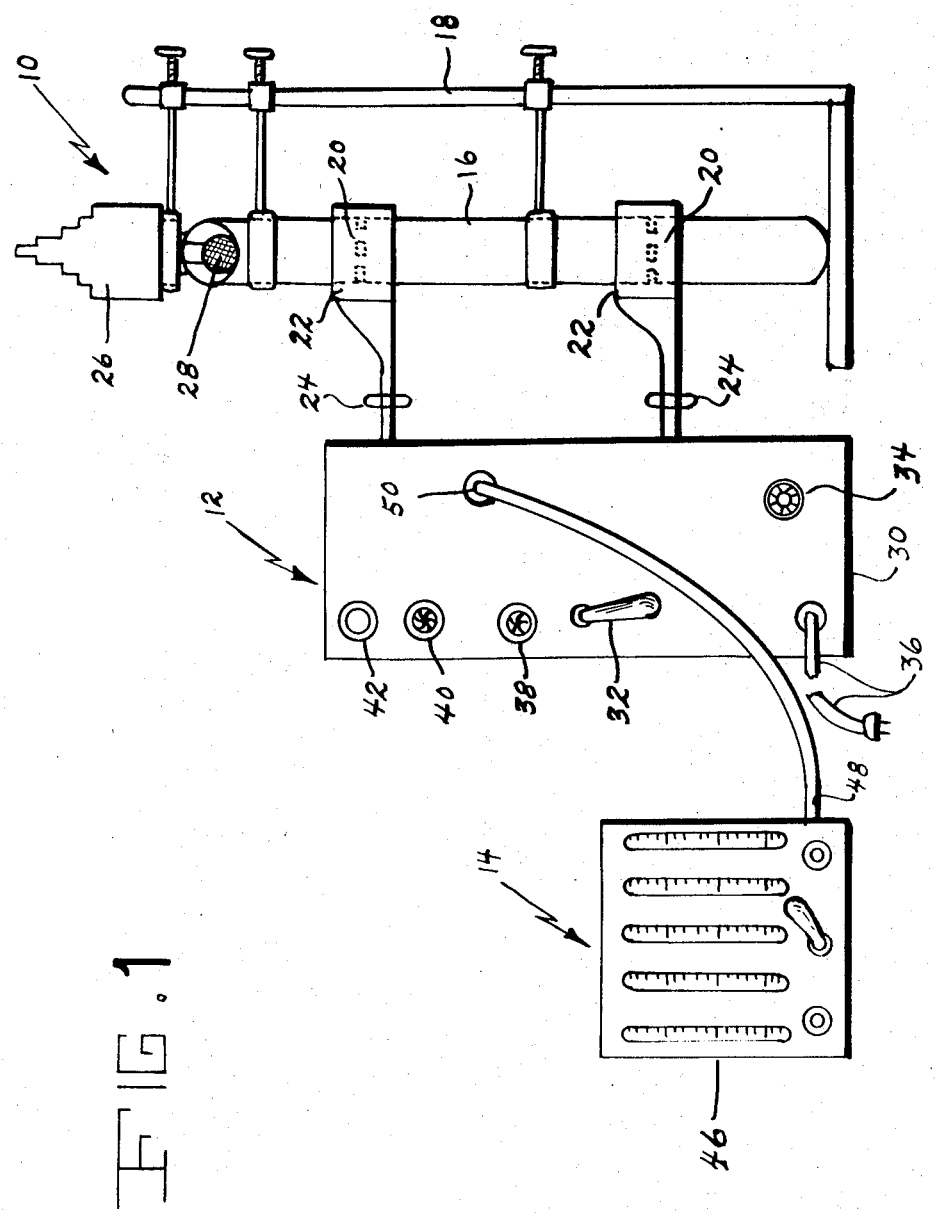
FIG. 1 is a diagram of the system.

Referring now to FIG. 1 the falling ball viscometer is shown generally at 10, the timer control system generally at 12, and the timer generally at 14.

The falling ball viscometer consists of a precision tube 16 made of any nonconductive material. The tube is supported by a tube stand 18 which also may be an integral part of the timer control system case 30. The tube has scribe marks 20 indicating a known and measured distance. Surrounding the scribe marks are coils 22 which are connected to the control circuit by the wires 24. Mounted above the tube 16 is a ball release mechanism 26 and shown in position is the metal ball 28.

The timer control system case 30 has mounted thereon an on-off switch 32, a fuse receptical 34, and a line cord 36. Above the switch is light 38 for indicating when the timer is functioning. An "ON-OFF" indicator light for the control circuit is at 40 and a reset switch is shown at 42. The timer 46 is connected to control system by a line 48 which mates with a connector 50 on the case 30.

The timer 46 is shown as a highly accurate digital timer however the invention is not limited to any specific timing device.

Figure 2:
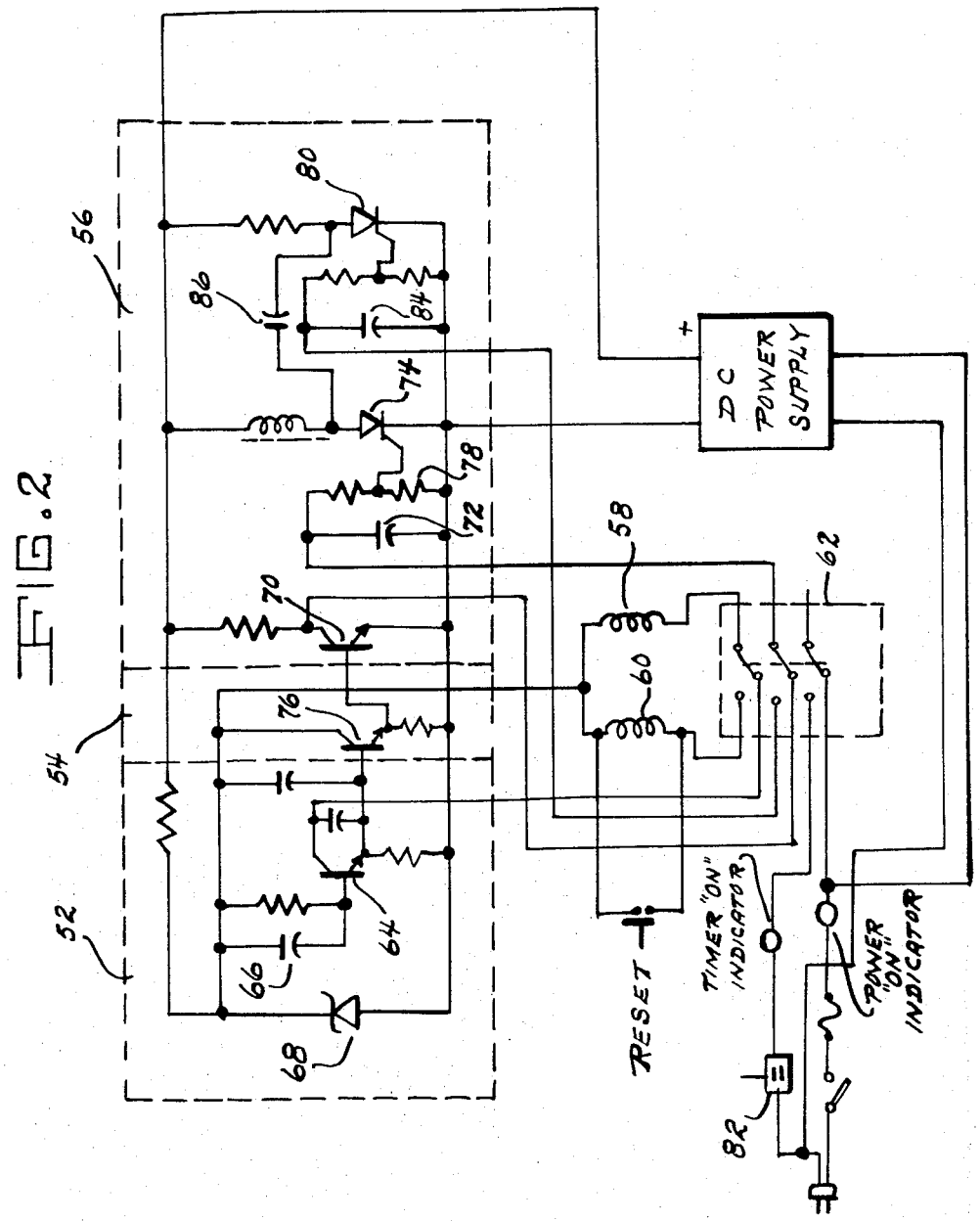
FIG. 2 is a circuit diagram of the timer control system.

FIG. 2 represents the circuit of the invention. The circuit is formed of three major components, an oscillator circuit 52, a detector circuit 54, and an RC switching circuit 56.

The sensing coils 58 and 60 of the oscillator circuit sense the falling ball. As the falling ball approaches a coil, the inductance of the coil changes and this change in inductance causes the output characteristics of the oscillator circuit to change.

At the outset of a measurement coil 58 (the upper sensor) is connected into the circuit by the relay 62. The value of coil 58 is such that the amplitude of oscillation at the emitter of transistor 64 increases and forces the voltage difference between the base and emitter to decrease and thus cut off the transistor (64). Capacitor 66 charges to the voltage difference between the base and emitter of transistor 64 until it cuts off, then capacitor 66 charges toward the Zener diode (68) voltage. As the voltage across capacitor (66) increases, transistor 64 begins to conduct and the oscillator circuit begins to function until the transister (64) is again turned off. This cycle continues as long as the falling ball is not near the sensing coil 58. The voltage at the emitter of transistor 64 is fed into the detector circuit 54. Its output is fed into the base of transistor 70. The output voltage of the detector circuit keeps the transistor 70 saturated and thus prevents capacitor 72 from charging to a voltage that would allow the silicon controlled rectifier 74 to conduct.

During a measuring sequence, the ball is released and as it falls and approaches the sensing coil 58, the inductance changes causing the voltage waveforms of the oscillator 52 to change. The voltage at the emitter of transistor 64 is fed into the detector circuit 54, however, since transistor 76 is operated in a reduced mode, it will not respond to this high frequency (1 MHZ) sine wave input signal. The output voltage of the detector circuit is 0 volts, and since this output is fed to the base of transistor 70, this transistor will be non-conductive and capacitor 72 is then allowed to charge toward the Zener diode voltage.

When capacitor 72 is charged appropriately, the voltage across resistor 78 is sufficient to fire the silicon controlled rectifier 74. Once the rectifier 74 is conducting, the relay 62 is activated and switches the sensing coil 58 out of circuit and sensing coil 60 into the circuit. Further, the collector of transister 70 is switched to the silicon controlled rectifier (80) charging circuit, and power is switched to a timer via timer plug 82. Since the falling ball is at the upper sensing coil 58, which was switched out of the circuit, the circuit output waveforms will again be pulsed and unperturbed. Capacitor 84 will not be allowed to charge up since transistor 70 is again saturated.

When the falling ball approaches the lower sensing coil 60, the oscillator waveforms will again change and transistor 70 will become non-conductive and capacitor 84 will charge appropriately and cause the silicon controlled rectifier 80 to conduct. The voltage across capacitor 86 will momentarily be placed across rectifier 74 causing it to become non-conductive. As the rectifier (74) ceases to be conductive, the relay (62) will open and return the circuit to its original state, thus cutting off the power to the timer. Hence, the time measured by the timer represents the time required for the ball to fall through sensor 58 and sensor 60.

Having thus described our invention in clear and sufficient detail we assert the following claims:

We claim:

1. A precision viscometer timer control system comprising: a falling ball viscometer, including a support means, a precision tube mounted in the support means, a metal ball and a ball release means positioned above the tube; a timing means; a timing control circuit connecting the timing means to the said viscometer including a first and second sensing coil, an oscillator circuit comprising, a first transister having a base, emitter and collector, a resistor and capacitor connected in parallel to the base of said transistor, a Zenner diode resistively connected between a power supply and the emitter of the transistor, a capacitor connected between the collector and emitter of the transistor, a capacitor connected between the input signal line and said emitter, and an inductor connected between the collector and base of said transistor through said parallel connected resistor and capacitor for producing a known signal in the first and second coils and sensing a change in said signal; a detecting circuit and a switching circuit which when combined with the oscillating circuit engage and disengage the time means.

2. A circuit according to claim 1 comprising: a second transistor having a base, emitter and collector and having its base connected to the emitter of said first transistor and further having its collector resistively connected to a power supply and the emitter of said transistor connected to the anode of the Zenner diode.

3. A switching circuit according to claim 2 comprising: a third transistor with a base, emitter and collector, having its base connected to a detector output, collector resistively connected to a power supply and emitter to the Zener Diode anode; a first silicon controlled rectifier having its cathode connected to a power supply through a parallel resistance-capacitance circuit to the collector of said third transistor; and a second silicon controlled rectifier connected through a resistance-capacitance circuit to said first silicon controlled rectifier and a capacitive connection between the anode of said first and second silicon controlled rectifiers.

* * * * *